Nov. 21, 1967

J. R. CARTHEW ET AL 3,354,437

DATA TRANSLATION APPARATUS

Filed Dec. 23, 1964

1 LINE ADDRESS

2 DURATION-ONE TRANSLATION

3 FORWARD GATE 72

4 SOT TAG AT 39

5 SET DECREMENT CONTROL

6 DECREMENT TRIGGER 53

7 TRANSLATOR MEMORY 35

8 CHARACTER STREAM 50

9 CHARACTER REG 47 INPUT

10 DECODER LATCH 54

11 RESET 37, 47, AT 2,3

12 SET 37

13 GATE 37 TO 57 AT 2,3

14 REGEN. CHARACTER STREAM

15 RESET 57 AND 47 AT 1

16 GATE 47 AT 23 TO 57 AT 23

17 GATE 47 AT 1 TO 57 AT 1

18 RESET 57 AT 1

FIG. 4B

Nov. 21, 1967  J. R. CARTHEW ET AL  3,354,437
DATA TRANSLATION APPARATUS
Filed Dec. 23, 1964  7 Sheets-Sheet 6

FIG. 5A

1 LINE ADDRESS
2 DURATION-ONE TRANSLATION
3 BACKWARD GATE 73
4 SLOT TAG 39
5 SET DECREMENT CONTROL
6 DECREMENT TRIGGER 53
7 TRANSLATE MEMORY 35
8 CHARACTER STREAM 50
9 CHARACTER REG 47 INPUT
10 SET COMPARE LATCH 65
11 RESET 37, 47, AT 23
12 OUTPUT LATCH 65
13 CLOCK AT AND 100
14 CHARACTER STREAM REGEN
15 RESET REGISTER 57 AT 1
16 GATE 47 AT 23 TO 57 AT 2
17 GATE 47 AT 1 TO 57 AT 1
18 GENERATE "1s" IN 57
19 RESET DECREMENT CONTROL
20 RESET 47 AT 1

FIG. 5B 3,354,437
DATA TRANSLATION APPARATUS
John R. Carthew, Edward Loizides, and Louis A. Mitta, Hyde Park, N.Y., assignors to International Business Machines Corporation, New York, N.Y., a corporation of New York
Filed Dec. 23, 1964, Ser. No. 420,752
9 Claims. (Cl. 340—172.5)

ABSTRACT OF THE DISCLOSURE

Translator apparatus accomplishes the conversion of a character of information expressed in one code to the same character of information expressed in another code. Regenerating storage circuitry stores the characters in one code in the translator. A data path having gating circuitry accepts a character stream of data expressed in the other code from a data channel when translation is commenced. Control circuitry responds to the character from the storage circuitry and those in the data path to provide an activating signal for character altering circuitry in the data path. The characters in the character stream are then logically acted on until a predetermined test is satisfied indicating that a conversion has taken place when readout from the translator is accomplished.

---

This invention relates to information handling apparatus and, more particularly, to a data translation system for concurrently processing a plurality of conversions of information manifestations each expressed in its own first code into the same information manifestations each expressed in its own second code.

In present day data processing and communicating systems, the necessity arises for translating among the manifestations of information as expressed in various codes. This is particularly true in systems having a number of different communication units connected in time multiplexed manner to operate together. Often the data handled in these units employ different codes and when multiplexed into the data processing equipment utilize still other codes. In these instances, translation of the data must be accomplished among the various codes so that the data codes of the data processing equipment are employed. When the data is transferred from the data processing equipment to a particular communication unit, it is then necessary to translate to the code of the particular communication unit.

Accordingly, it is a general object of the invention to provide an improved data translation system for converting among the various codes employed in data processing and communicating systems.

Code translators are of many types and include those which employ a memory medium for storing the various codes. The translators of this type fall into two categories. In the first category, one of the codes is permanently stored and other circuitry is utilized for storing or generating the other code. In the second category, the initial and final codes are permanently stored in the memory medium. The translator of this invention falls into the first category.

Available translators of this type provide for storing one code in the storage medium and the second code is effectively stored in a clocking circuit which controls the storage medium. Comparison is made in this arrangement until an equal condition is obtained. The desired code is either the clock reading in the case of a comparison with the storage medium or the next code out of the storage medium when a comparison is made with the clocking circuit. Such arrangements require extensive clocking circuits and are not particularly useful where multiplexing operations are involved as added storage devices are required.

Thus, it is another object of the invention to provide code translating apparatus which can time multiplex data from several independent data channels each with its own code.

It is another object of the invention to provide a code translator having the ability to handle serially more than one code conversion with a single storage unit.

It is a further object of the invention to provide a code translator which does not require that all character codes be stored in the storage medium of the translator.

A further object of the invention is to provide an improved code translator which converts information expressed in one code in a character by character manner into the same information expressed in the second code.

Briefly, the foregoing objects are realized by providing a translator for accomplishing the conversion of a character of information expressed in a first code to the same character of information expressed in a second code. Means are provided for storing the characters of one of these codes and for regenerating their storage. Means are also provided for accepting a character stream of data expressed in the other of these codes from at least one data channel on the occurrence of an indication of the commencement of translation. Means are provided for logically operating on the characters of the stream of data and the storage means until a desired predetermined condition occurs indicating that the conversion has taken place when readout from the translator is accomplished.

According to one feature of the invention, translation may be accomplished in a first direction from the code of a character entering the translator in the character stream to a corresponding character stored in the memory medium in another code. Character altering circuitry is provided in a recirculating data path which accepts the character stream. The altering circuitry responds to a correspondence between the indication of commencement of translation with a reference manifestation in the memory medium. The character undergoing translation is continually altered each time it is recirculated through the data path until a predetermined test is accomplished. When this test occurs, the character which is in the next time slot in the memory medium is the translated character. It is then gated through suitable enabling circuitry to the output of the translator.

Another feature of the invention provides for the translation of a character to be made from the code of the characters stored in the memory medium to the code of a corresponding character generated in the translator. To accomplish this, a character having the code stored in the memory medium is placed in the character stream after a predetermined correspondence has occurred between the original coded character in the character stream and characters in the memory medium. Each time that this character is recirculated through the data path, it is logically altered until the reference manifestation of the memory medium is detected. When this occurs, a second enabling circuitry is gated and the character in the data path is gated out of the translator having the code of a generated translated character.

The foregoing and other objects, features and advantages of the invention will be apparent from the following more particular description of a preferred embodiment of the invention, as illustrated in the accompanying drawings, wherein:

Figure 1:
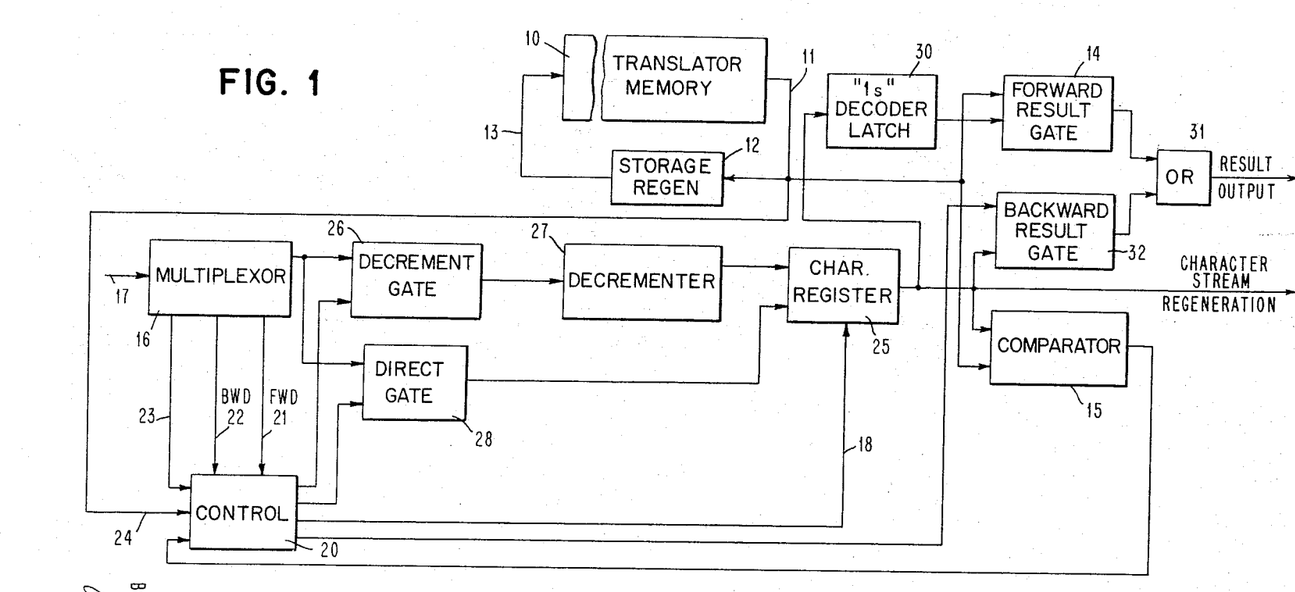
FIGURE 1 is a block diagram of a generalized form of code translator embodying the principles of the invention.

Referring now to FIG. 1, the translator, according to the invention, comprises a translator memory medium 10 having an output connection 11 connected to a storage regeneration circuit 12. The memory 10 may take any suitable form and may be a serial type delay line or shift register. Regeneration circuit 12, which may take the form of a binary trigger, is connected back into the memory 10 through the connection 13. The output of the memory 10 is also connected to a forward result gate circuit 14 and to a comparator 15 and through a connection 24 to a control circuit 20. Through connection 24, control circuit 20 responds to a unique stored representation in the memory indicating a start of translation tag.

The translator also comprises a multiplexor 16, which is adapted to be connected to a plurality of input lines. Each of the lines carries data which may be expressed in a different code. For purposes of this description, only one such line is illustrated, and it is referred to as the character stream 17. However, each of these lines is connected to its own communicating or data processing system and each is scanned in turn by the multiplexor unit, so that its data can be processed in the translator.

The multiplexor 16 is connected to the control circuit 20 through several control lines. Forward direction 21 and backward direction 22 translate lines are connected to circuit 20 to render it responsive to a translation in one of two directions. The control circuit 20 is also connected through a translate mode line 23 to the multiplexor. As will be explained in greater detail hereinafter, line 23 carries an indication of a request for a translation to be made and also to place the translator in operation in the translate mode. This indication may be the first bit of a character entered into the multiplexor 16 in character stream 17.

From multiplexor 16, parallel circuits form a data path to a character register 25. The first circuit comprises a gate circuit 26 and data altering circuitry which changes a character passing through it by a fixed amount. Such circuitry can increment or decrement the character. For illustrative purposes, this circuit is referred to as a decrementing path. In addition to gate 26, it includes a decrementer 27. The second circuit is the direct path, and it includes only a gate 28. Thus, the character stream 17 from multiplexor 16 may be passed through either the decrementing path or through the direct path to the character register 25.

Passage of the character stream through one of these paths is determined by the gating from the control circuit 20. Each of the gates 26 and 28 is connected to the output of control circuit 20 and dependent on the signal provided by this control circuit, one of these gates is activated to permit passage of the character stream to the character register 25. When the character stream passes through the decrementing path, it is decremented by one order of magnitude.

Connected to the output of character register 25 is a "1's" decoder circuit 30. The purpose of this circuit is to perform a predetermined test on the output of the character register during a forward direction translation. A forward direction translation is defined as the translation of the code of a character entering the multiplexor 16 in the character stream to the corresponding character with its code stored in memory 10. If the contents of the character at the output of register 25 during a forward direction translation expresses an all binary "1's" manifestation, the test of the decoder 30 is satisfied and a signal is provided to enable the forward result gate circuit 14. Activation of forward result gate circuit 14 permits the next character stored in the translator memory 10 to be gated to the translator result through an OR output circuit 31. At the same time, the character from character register 25 is entered back into the character stream to be regenerated through the translator.

A translation in the backward direction involves the generation of a character in the character stream. This character is codified according to the code of the characters stored in the translator memory 10. During a translation in the backward direction, the comparator 15 is employed. The output of the translator memory 10 is connected to the comparator 15 along with the output from the character register 25. Each time that a character enters the multiplexor 16 in character stream 17, it is passed through direct gate circuit 28 to the character register 25 until a comparison is effected in the comparator 15 between this character and the output 11 from the translator memory 10.

When this comparison occurs, the control circuit 20 is activated to generate a substitute character in the character stream through the connection 18. At the same time, direct gate circuit 28 is disabled and decrement gate circuit 27 is enabled from control circuit 20. Thereafter, each time the substitute character is regenerated through the translator it is decremented at 27. This action continues until the unique stored representation indicating the start of translation tag in memory 10 is detected. This causes control circuit 20 to enable the backward result gate 32 to permit the character to pass from register 25 to the OR result output circuit 31. Again, the character stored in register 25 is regenerated in the character stream.

Figure 2A:
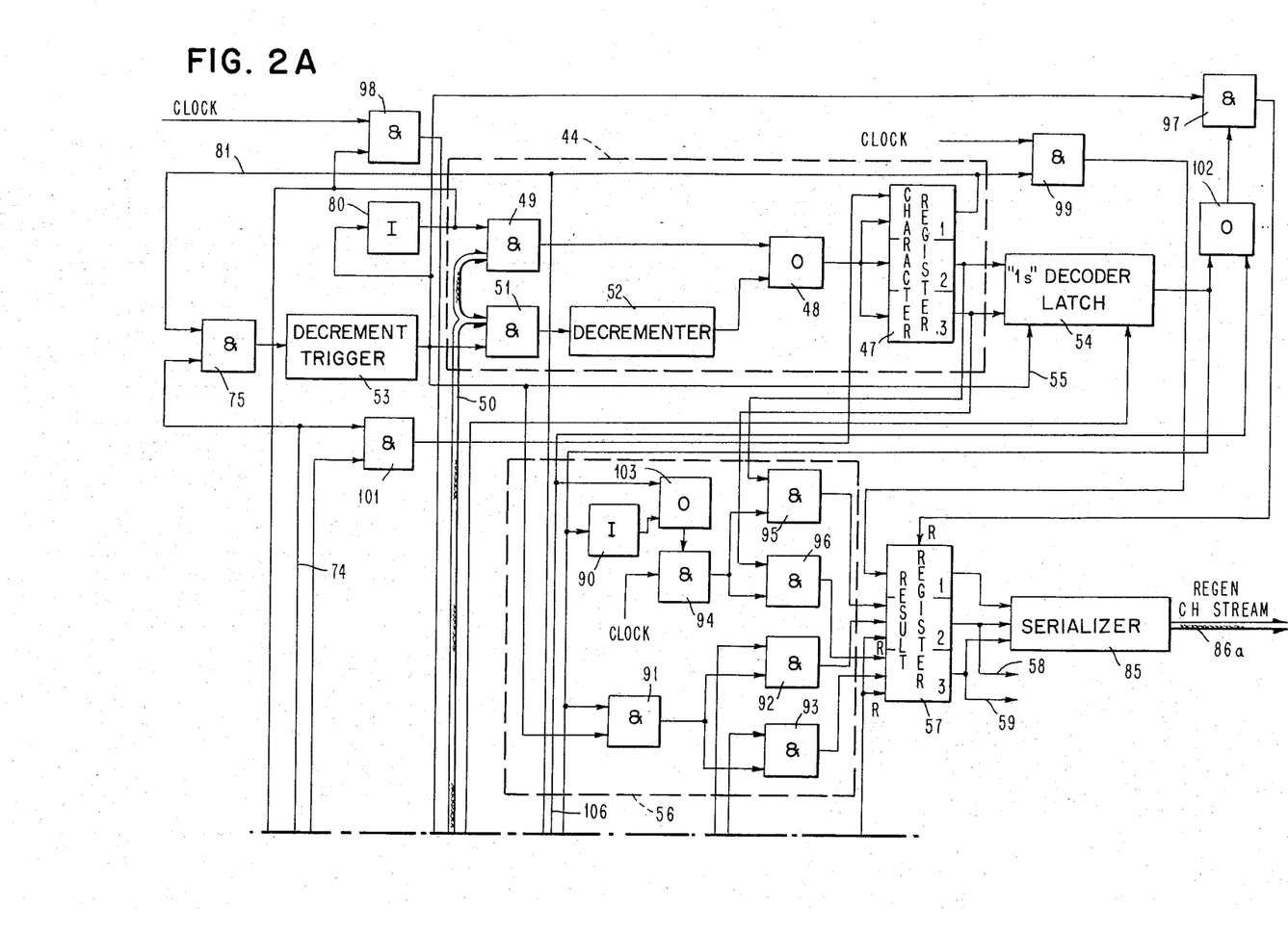
FIGURES 2a and 2b taken together form a block diagram illustrating a detailed embodiment of the translator according to the invention.
Figure 2B:
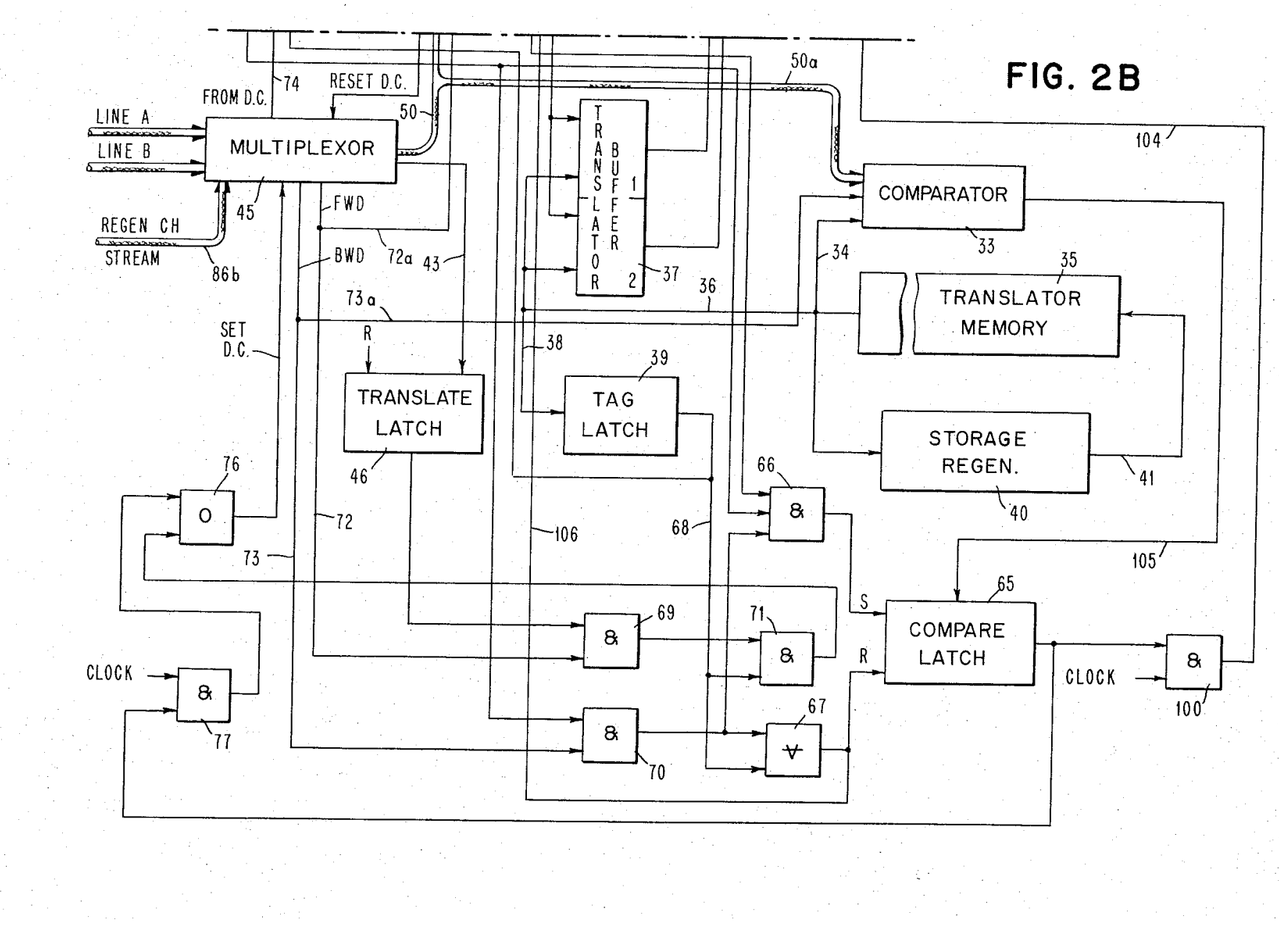

A detailed embodiment of the code translator employing the principles of the invention is shown in FIGS. 2a–2b. In these figures, the translator memory is indicated at 35 as having an output connection 36 to a two position translator buffer 37 for accepting in parallel each two bit character from memory 35 and through an additional output connection 38 to a tag latch circuit 39. An additional output connection 34 is made to a serial type comparator circuit 33. Storage regeneration of the characters in this memory is provided through a regenerating circuit 40, which may take the form of a binary trigger, and a connection 41.

Figure 3:
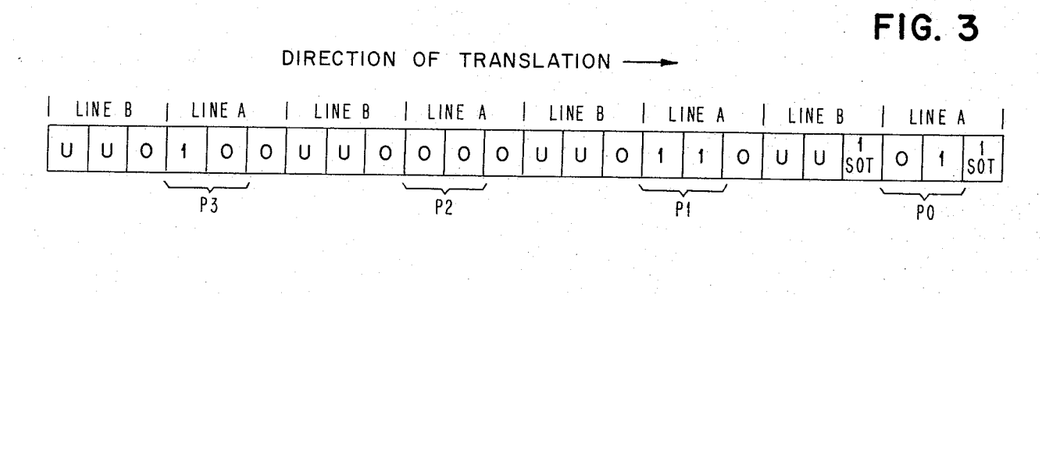
FIGURE 3 is a diagram illustrating how a portion of the storage medium employed in the translator has the various codes stored in it.

Translator memory 35 is of the serial type and may have a plurality of independent codes stored in serial manner. Thus, as shown in FIG. 3, the storage of two such codes is illustrated. The first code is employed in a translation operation with a character stream entering the code translator on Line A and the second code is employed in a translation with the code of the character entering on Line B. In the first storage position of each code in memory 35, the character is provided with a tag bit to indicate a predetermined reference condition. The condition is called the Start of Translate (SOT) tag. Thus, the SOT designation of binary 1, in the first storage position for each line at the right of the serial memory, provides a reference for the start of the translation. The second and third positions for each line actually carry the code character. Thus, for the Line A the characters appear in the following order: 10, 11, 00 and 01. For the Line B characters, a U for unconcerned has been inserted as this is provided merely by way of illustration, and for purposes of this description, we are not concerned with the contents of these positions.

In the description of code translator operation to be made hereinafter, both forward and backward translation operations will be described. A forward translation (code 1 to code 2) takes place between the code of the characters in the translator memory. In a backward translation (code 2 to code 1), a character having the code characters stored in the translator memory is generated for the character stream. The number of codes which may be used in the translation is limited only by the amount of storage available and by the bit length of the codes. For example, translation could be performed between the following translation sets:

| Code Type 1 | Code Type 2 |
| --- | --- |
| A | P |
| B | Q |
| C | R |

In this illustration, translation is described between the A and P Codes which have the indicated character configurations:

| Code 1 | Code 2 |
| --- | --- |
| A | P |
| $A_0=00$ | $P_0=01$ |
| $A_1=01$ | $P_1=11$ |
| $A_2=10$ | $P_2=00$ |
| $A_3=11$ | $P_3=10$ |

The multiplexor 45 of this translator receives plural input lines, designated Line A and Line B. Although only two such lines are shown, it is obvious that additional lines may also be connected into the multiplexor. In this way each line can carry data characters expressed in its own unique code. In the case of translation in the forward direction, these characters are translated sequentially to the corresponding characters stored in the translator. If a backward translation takes place, a character having a code of a character stored in memory 35 is generated in the translator for its corresponding line. Multiplexor 45, which accepts these input lines, is connected to a translate latch 46. Latch 46 is provided with the first bit of a given character stream from the multiplexor to indicate that a translate operation has been requested and can occur. The presence of this bit at latch 46 sets it to the translate mode of operation.

The character register of this code translator is indicated at 47 as forming part of a data path generally indicated at 44. Register 47 is a three position register which accepts three bits of a character in parallel. As will be explained more fully hereinafter, the first register position receives the translate mode bit from a character stream entering multiplexor 45. Register 47 is coupled to parallel data passing input circuits in data stream 44 through an OR gate 48. One of the parallel input circuits is directly connected to the OR gate 48 through an AND gate 49. The second of the parallel circuits comprises an AND gate 51 and a circuit for altering a character by a fixed quantity. As already explained, this circuit may be an incrementer or a decrementer. For purposes of this illustration, it has been chosen to be the decrementer 52. The AND gates 49 and 51 are controlled by a decrement trigger 53, which will be described more fully hereinafter. Only one of the gates 49 and 51 can be activated at a single time. When enabled, it permits the character stream 50 to pass to register 47.

In its first position, character register 47 stores the translate mode indication that the translation is in progress and in the second and third positions the actual data undergoing translation. These second and third register positions have their outputs connected to an all "1's" decoder latch 54. This circuit is an AND circuit which performs a predetermined test which, for convenience, has been chosen to be a binary "1's" test. Latch 54 is operative only during a translation in the forward direction to provide an up level output signal if both inputs from the second and third register stages of character register 47 satisfy the test. If either of these input signals is not a binary 1, then the decoder 54 provides a down level output signal. In order for this decoder to respond to the inputs from the second and third register stages of character register 47, it must be set through the connection 55 from the decrement trigger 53 and through a forward translation control line 72a from multiplexor 45.

The output from the decoder latch determines if a result output is going to be produced by the code translator during a forward direction translation. Therefore, it is connected through appropriate gating circuitry, indicated in dashed line form at 56, to a result register 57. This register is a conventional register having three positions. The first position accepts a set input generated from the corresponding position of character register 47. Through this position, the translate mode bit is regenerated in the character stream 86a–86b. The second and third positions receive either the contents of the second and third positions of register 47 or the contents of the first and second positions of translator buffer 37. The outputs from the positions of result register 57 are connected to a serializer 85 in order to provide a serial character stream regeneration at 86a–86b. The outputs from the second and third register positions may also be taken in parallel at 58–59.

In addition to comparator 33 which receives the character stream through 50a, the controls for comparing the characters of the character stream 50 with the contents of the translator memory 35 include a compare latch 65 which responds to the output of an AND gate 66 which sets latch 65. The latch 65 is reset through an Exclusive-OR circuit 67 which responds to the output of the tag latch circuit 39 through a connection 68. Also included in this comparison control circuitry are the AND gates 69, 70 and 71 which respond to the output of the translate latch 46 and to forward 72 and backward 73 translate lines connected to multiplexor 45.

Multiplexor 45 also contains decrement controls which act through a connection 74 and AND gate 75 to set the trigger 53. These decrement controls are in turn set through the OR gate 76 operating from either the AND gate 71 or the AND gate 77.

In order to provide a better understanding of the translator employing the principles of the invention, a translate operation is described. A forward direction translation is first described. This type of translation is referred to as a code type 1 to code type 2 translation. A character entering the system on one of the input lines to the multiplexor 45 is translated to a corresponding character stored in the translator memory 35.

Figure 4A:
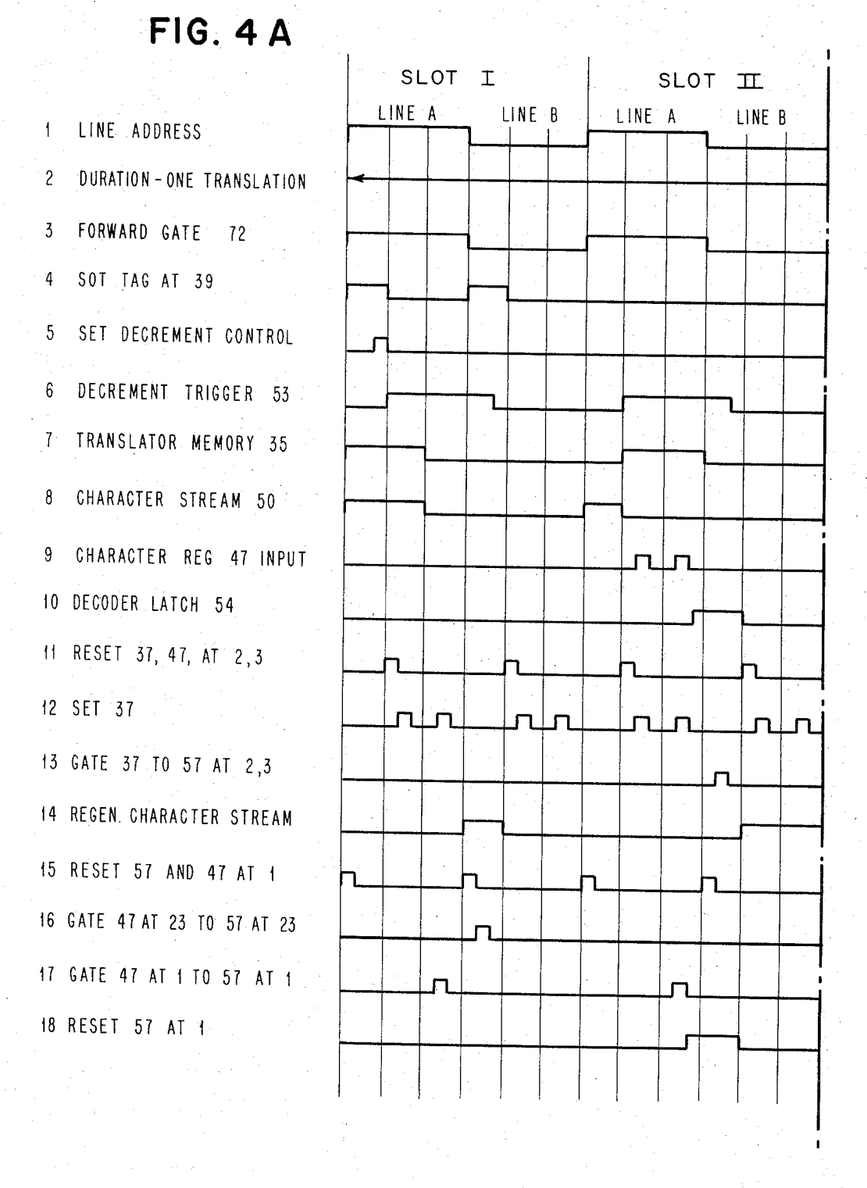
FIGURES 4a and 4b taken together form a timing diagram illustrative of the operation of the code translator during a forward code translation operation.
Figure 4B:
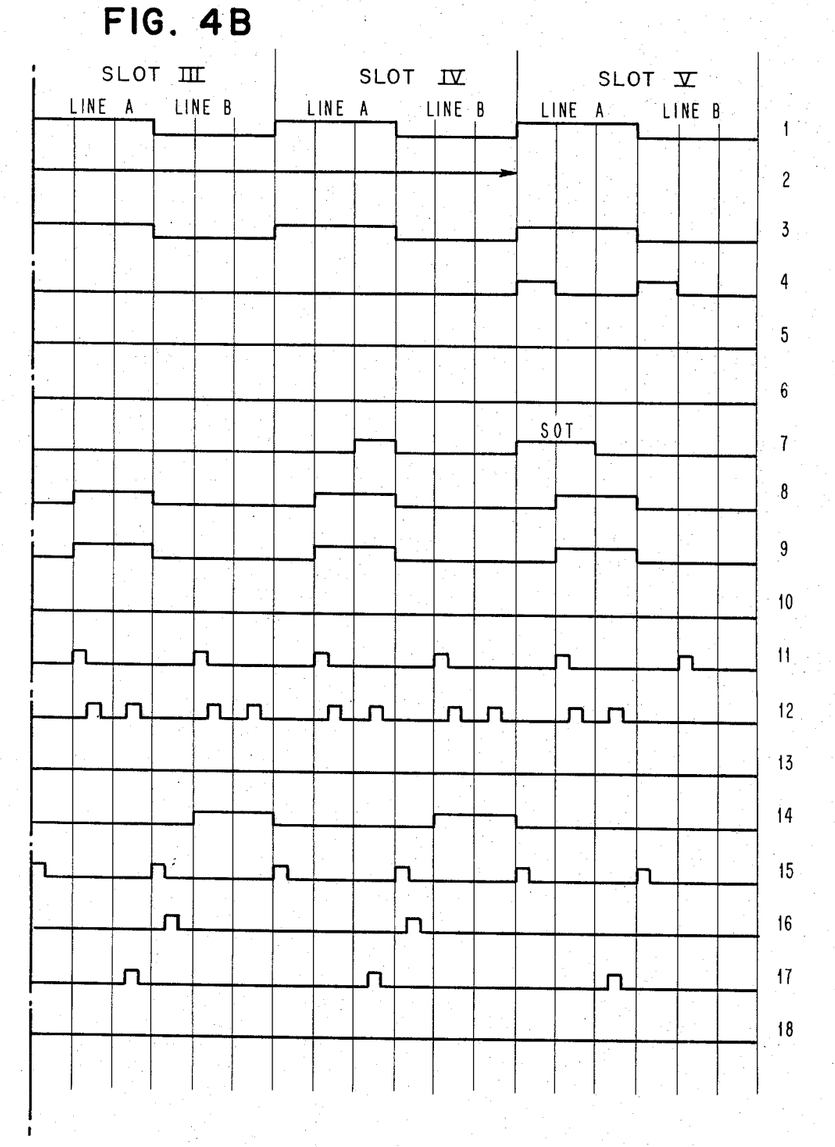

As shown in FIGS. 4a and 4b taken together, the period required for multiplexing all of the lines connected to multiplexor 45 is referred to as a slot. Although only two such lines are illustrated, it is obvious that additional lines can be added. Within each slot each line that is being multiplexed appears in sequence. Thus, in the illustration, the Lines A and B alternate (line 1) at the multiplexor 45.

In the diagram of FIGS. 4a and 4b, division is made itno five slot times. The first four of these slot times correspond to the duration of one revolution of the memory 35. This aspect of operation is shown on line 2 of the diagram. The additional slot time is the beginning of the second revolution of memory 35.

To accomplish a translation in the forward direction, the forward translate line 72 from multiplexor 45 to AND gate 69 is raised, as shown on line 3 of the timing diagram. At the same time, AND gate 69 is responding to the output of translate latch 46. If the origin character stream emanating from multiplexor 45 contains the request for translation or translate mode bit which is shown in the first bit position on line 8 of the timing diagram, it is applied through the connection 43 to set the translate latch 46. It is not necessary that this translate mode bit appear immediately in the origin character stream. However, the translation cannot occur until it does appear, so that the AND gate 69 can be activated to provide an up level input signal to the AND gate 71. The output of AND gate 71 is supplied through the OR gate 76 to set the decrement controls (line 5) in multiplexor 45. Unless AND gate 71 provides an up level output signal, these controls are not set and the origin character stream 50 is gated through AND gate 49 and then OR gate 48 into the character register 47.

In order that AND gate 71 provide an up level output signal the SOT tag of the characters stored in translator memory 35 must be detected by the tag latch 39 through the connection 38. If this tag is detected, the latch is set and an up level output signal is supplied through connection 68 to enable gate 71. The up level output signal from gate 71 is applied through OR gate 76 to set the decrement controls in the multiplexor 45.

As previously stated, if the decrement controls in multiplexor 45 are not set, the character stream 50 is gated through the direct gate path including AND gate 49. Gating through the direct gate path occurs, since the decrement trigger 53 has not been set and is providing a down level output signal to decrement gate path. The down level output signal provided by trigger 53 is inverted at 80 to provide the up level output signal which enabled the gate 49. Thus, the origin character stream passes through the direct gate path to character register 47.

The translate mode bit is shown in bit position 1 of Slot I on line 8. This bit is fed to register position 1 of character register 47 to set the register to the translate mode. The actual data bits in the second and third time positions of the slot are applied to register positions 2 and 3. When bit 1 is present, an up level output signal is supplied from register position 1 through connection 81 to AND gate 75. This gate is then enabled to permit the decrement trigger 53 to be set, if the decrement controls are set in multiplexor 45 to supply a signal through the connection 74. If the translate mode bit is not present, the decrement trigger cannot be set.

Referring to the timing diagram of FIGS. 4a and 4b, line 4 shows the SOT tag from the translator memory 35 supplied to the tag latch 39. Line 5 shows the setting of the decrement control circuits in the multiplexor 45 after a signal is supplied through OR 76 from AND 71. Line 6 illustrates the output provided by the decrement trigger 53 to enable AND 51 and decoder latch 54 through connection 55.

Regeneration of the characters in the character register is provided through a serializer 85 which accepts the respective outputs from the positions 1, 2 and 3 of character register 47 under the control of the gating circuitry generally indicated at 56. Serializer 85 generates them in serialized form back into the regenerated character stream 86a–86b. This aspect of operation is shown on line 14 of the timing chart wherein the character on line 8 (Slot I) in the character stream 50 has been decremented once and provided on line 14 (under Line B) in the regenerated character stream.

When the decrement trigger 53 is providing an up level output signal, it indicates that the decrement controls of the multiplexor 45 have been set and also that the translate mode bit has occurred in the first register position of register 47. Thereafter, each time that this character appears in the origin character stream 50, it passes through AND 51, decrementer 52 and OR 48 so that it is decremented by one order of magnitude. This decrementing process continues until the predetermined test of an all "1's" character is satisfied at decoder latch 54. This is accomplished when each of the output signals provided by the register positions 2 and 3 of character register 47 are at up levels indicating binary 1 conditions. This aspect of operation is shown on line 9, Slot II of the timing diagram. The output from decoder latch 54, as shown on line 10 of this diagram, indicates the occurrence of the "1's" condition. When the all "1's" test condition has occurred, it indicates that the next character coming from the parallel temporary store at translator buffer 37 should be the translated character as expressed in code 2.

The up level output signal provided by decoder latch 54 is applied to translator buffer 37 to set this buffer enabling it to provide its contents to the gating circuit 56. The output of decoder latch 54 is also applied to the inverter circuit 90 and to AND 91 in gating circuit 56. AND 91 when enabled provides a signal which enables AND's 92 and 93 to permit the contents of translator buffer 37 to be gated to the register positions 1 and 2 of the result register 57. Thus, with decoder latch 54 providing an up level output to AND 91 and with the decrement trigger 53 providing an output to this AND gate, the contents of the translator buffer is gated into register 57. This data can be regenerated back into the character stream by serializer 85. It will continue to be regenerated through the direct gate circuit of data path 44 until it is removed from the translator by external circuits connected to multiplexor 45. It may also be provided as a parallel result output at the lines 58 and 59 connected to positions 2 and 3 of register 57.

At the same time that decoder latch 54 provides an up level signal to gating circuit 56, it provides this same signal through OR 102 to AND 97. This AND gate also responds to the output of decrement trigger 53 to provide a reset or inhibit signal to register position 1 of result register 57. This prevents any signal indicative of the translate mode bit from being passed to the character stream 50 when the translated character occurs. This aspect of operation is shown on line 8, Slot II of the timing diagram.

In the absence of the detection of an all "1's" condition in the positions 2 and 3 of the character register 47, decoder latch 54 provides a down level output signal which is inverted at 90 and supplied to AND 94 through OR 103. AND 94 is suitably clocked by a system clock (not shown) which produces its clocking signal throughout the translation operation. When enabled AND 94 activates AND gates 95 and 96. These latter gates control the passage of the contents of the second and third register positions of character register 47 to the result register 57 for regeneration by serializer 85 in the regenerated character stream 86a. The first position of register 57 responds to AND 99 (line 17) which provides an up level signal when clocked if position 1 of character register 47 has the translate mode bit stored therein. In this way, the translate mode bit is regenerated.

As shown on line 15 of the timing diagram, setting of all the positions of the result register 57 and the first register position of character register 47 (the set lines are not shown in FIGS. 2a–2b) occurs at the beginning of each slot time for each multiplexed line. This permits these register positions to accept new data bits. Thus, if an incoming character stream does not contain the translate mode bit for register position 1 of character register 47, this register position provides a down level output signal through connection 81. This prevents the decrement trigger 53 from providing an up level output signal as shown on line 6 Slot III of the timing diagram. Again, as shown by line 8 (Slots III, IV, V) the same data signal is regenerated through the data path 44, until the multiplexor 45 accepts it. Once it is accepted a new character can be entered into the character stream and the entire process of a forward translation repeated.

During the forward translation operation, resetting of the translator buffer 37 and of the second and third register positions of character register 47 occurs (line 11) just before both of these registers accept data from translator memory 35 during the second and third bit times for each slot (line 12). These bits of data from the translator memory 35 must be temporarily stored in the translator buffer so that if the all "1's" condition occurs at the decoder latch 54, the contents of this buffer can be gated to the result register.

When the all "1's" condition occurs, as shown on the line 10, an up level signal is provided (line 13) to gate the contents of the translator buffer 37 to positions 2 and 3 of the result register 57. The opposite condition from that shown on line 13 of the timing diagram is shown on line 16. Instead of gating the contents of the translator buffer 37 to the result register 57, the contents of the second and third register positions of character register 47 are gated to the result register through the inverter 90 and AND gates 94–96. This condition indicates that the translation operation has not been completed and, therefore, the same character is regenerated in the character stream under the control of the decrement circuitry.

As already stated, when the all "1's" condition takes place, position 1 of result register 57 is reset from AND 97. This only occurs when the contents of the translator buffer 37 is gated to result register 57. The occurrence of the all "1's" condition also acts to reset the translate mode bit, and, therefore, the latch 46. Resetting of this translate mode condition also causes the resetting of the decrement control of the multiplexor 45 through an AND gate 98 which responds to the output of the decrement trigger 53 and the clocking signal supplied to the system.

In the translaiton from a code type 1 to a code type 2, the translate mode bit which acts to set the latch 46 is on during the entire translation until the translated character is provided by the result register 57. The decrement bit, on the other hand, comes on only when the information in the character stream 50 is to be decremented.

Translation in the backward direction from one code type to a second code type has been generally described. In such a translation, the code of a character stored in the translator memory 35 is applied to a character in the character stream. This operation is performed essentially by generating the new character within the translator. As shown in the timing diagram FIGS. 5a and 5b, the time required to perform this translation is divided into the time slots indicated as Slots I–V. Each slot has the same duration as previously defined for a forward type translation in that it covers the period necessary to multiplex each of the lines connected into the multiplexor 45. As shown on line 1, the Lines A and B entered into the multiplexor 45 appear and are addressed alternately by the system. The duration of one revolution of the translator memory 35 is indicated on line 2. This duration corresponds to the storage of four characters for each code stored in the memory 35. After the occurrence of the fourth character, the first one repeats itself after having been regenerated by the circuit 40.

Thus, the first character in the translator stream (line 7) is in the first time slot corresponding to the character P0 at the right side of the translator memory illustrated in FIG. 3. Thereafter, each time that the Line A is multiplexed on the timing diagram of FIGS. 5a and 5b, the contents of that slot corresponds to the contents of the next slot to the left in FIG. 3. For example, Slot II corresponds to P1, Slot III corresponds to P2, etc.

To perform a backward direction translation, the backward gate line 73 connected from the multiplexor 45 to the AND gate 70 is activated carrying an up level signal. As shown on line 3 of the timing diagram, this occurs during each slot, when that particular line is multiplexed into the system to perform this translation. AND 70, which is activated by this backward gate signal, also responds to the output of inverter circuit 80. Therefore, if the decrement trigger 53 is not producing an up level output signal, its down level output is inverted at 80 to enable AND 70. The output of gate 70 serves as one of the inputs to an Exclusive-OR circuit 67 which has as its input an indication through line 68 of the start of translate (SOT) tag. The Exclusive-OR circuit provides an up level output signal when only one of these two input signals is present. If an up level output signal is provided, it serves to reset the compare latch 65. Thus, if both of the signals are provided to Exclusive-OR 67 or if neither of the signals is provided, a reset is not supplied to compare latch 65.

The output of AND 70 is also supplied as an input to AND 66 which also responds to the output of inverter 80. Inverter 80 provides an up level output signal, since the output of decrement trigger is at a down level (line 6 of the timing diagram). AND 66 further responds to the indication of the state of the first register position of the character register 47. As shown on line 8 of the timing diagram, the translate mode bit is in the first bit position of the character stream and is, therefore, set in the first register position of character register 47. An up level output signal is, therefore, provided on the line 81 which is supplied to AND gate 66. When all three of these signals occur at 66, the compare latch is set by the up level output signal provided by AND 66. Setting of latch 65 is shown on line 10 of the timing diagram as occurring in the second bit period for the Slots I and II. When the compare latch 65 is set, it can respond to the occurrence of a comparison performed at 33.

Comparator 33 receives the character stream from multiplexor 45 through the connection 50a. It also receives the output of translator memory 35 through the connection 34. It performs a comparison of these signal trains if it is set by the backward direction translation control signal which is supplied through the connection 73a from multiplexor 45. When a comparison takes place, the indication of it is provided through the connection 105 to cause compare latch 65 to produce an up level output signal. This signal is applied through the clocked AND 77 and OR 76 to activate the decrement bit control in the multiplexor 45. This aspect of operation is shown on line 5 of the timing diagram. The output of the compare latch 65 is shown on line 12 of the timing diagram.

Figure 5A:
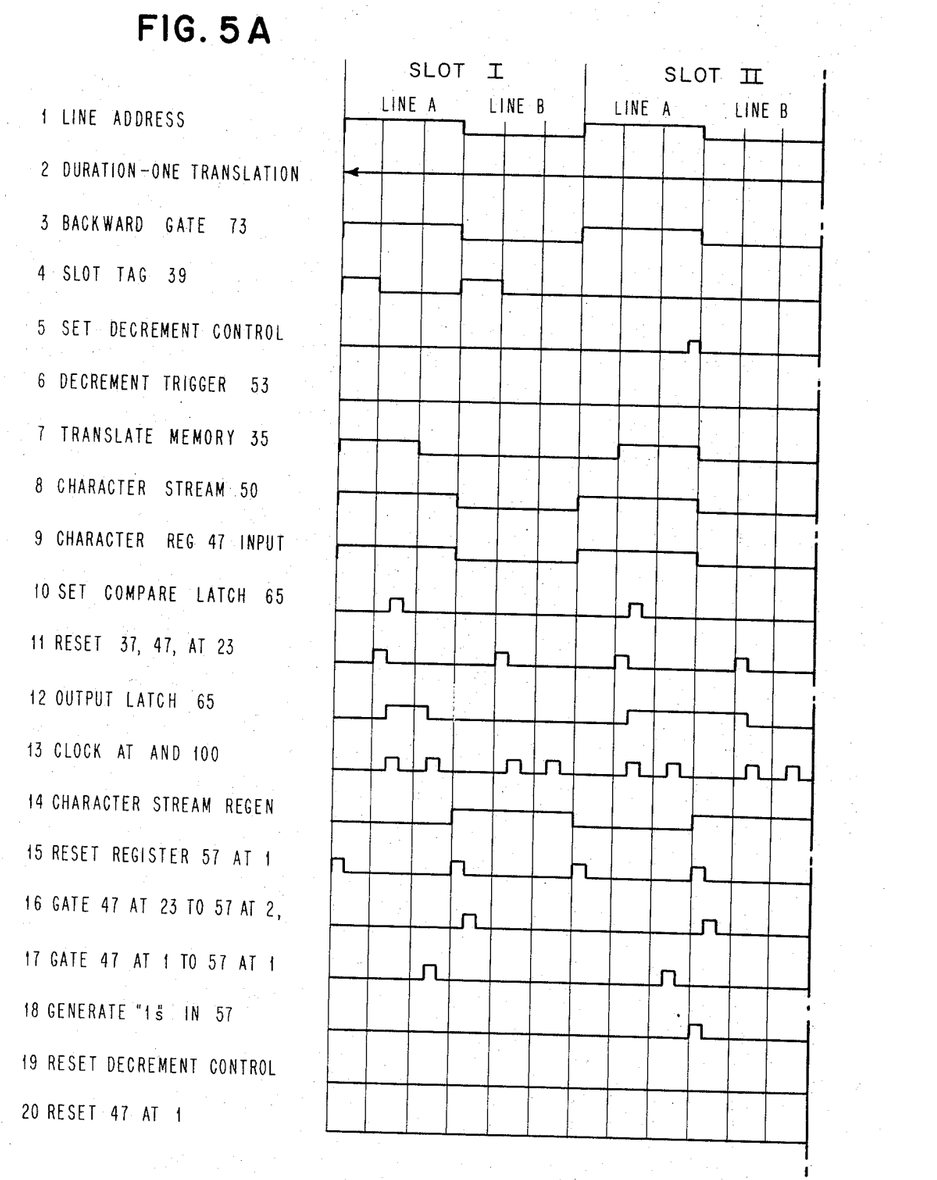
FIGURES 5a and 5b taken together form a timing diagram illustrative of the operation of the translator during the backward code translation.
Figure 5B:
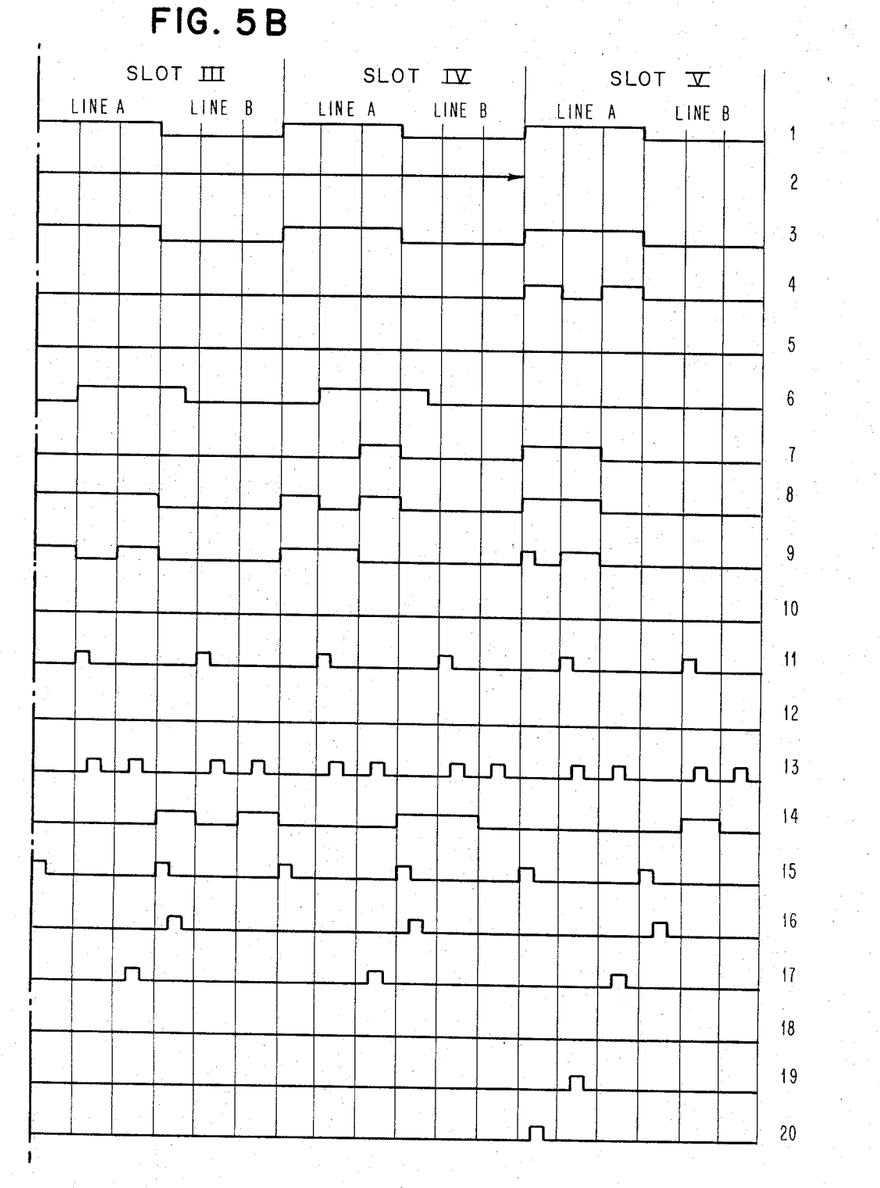

In Slot I of line 12, it indicates that a comparison took place in the first data bit position for the comparison on line 7 with line 8, but not in the second data bit position. As a result the output level dropped in the second data bit position. In Slot II, the output of latch 65 remains at an up level indicating that the comparison took place during the entire data bit period and, therefore, that a comparison between the complete characters of the translator stream (line 7) and the character stream (line 8) took place. Throughout this comparison the character stream has contained the same character until this comparison was effected.

The occurrence of a comparison of character stream 50 (line 8) with the translator memory 35 (line 7) also causes a substitute character to be generated in the regenerated character stream 86a–86b. This is accomplished through the connection 104 which applies the output of AND 100 to the second and third positions of result register 57. AND 100 receives the up level signal (line 12) provided by a compare latch and is sampled by the clock signals provided during the second and third bit times of each time slot. This aspect of operation is illustrated on line 13 of the timing diagram. The substitute character which is generated sets the result register 57, as shown on line 18, to a "1's" condition as shown in Slot II on line 14 of the timing diagram. This 11 character is now regenerated in the character stream. As will be explained more fully hereinafter, each time that the substitute character appears in the character stream, it will be decremented (line 9) in data path 44 until the translation is completed.

The regeneration operation explained above can occur since the result register 57 and the first position of character register 47 are reset, as shown on line 15 of the timing diagram at the beginning of each slot when each line is addressed. The regeneration operation on line 14 is some what delayed here because of the overlap into what is shown as the Line B time period. This does not effect any operations being performed with the multiplexed Line B because the corresponding part of that operation would overlap into the succeeding Line A time period.

Completion of a comparison in comparator 33 also causes the compare latch 65 to provide its up level output signal for setting of the decrement control in multiplexor 45. This operation takes place through the block 77 which is sampled as shown by the line 13 to provide a signal through OR block 76 to set the decrement condition in the multiplexor. It is illustrated in Slot II on line 5 of the timing diagram.

Setting of the decrement control causes decrement trigger 53 to provide an up level output signal in response to the up level signal provided on line 74 and the presence of the translate mode bit in the first register position of character register 47. The up level signal of decrement trigger 53 enables gate 51 and is shown in Slot III on line 6 of the timing diagram.

Since the gate 51 is enabled by the decrement trigger 53, each time that the substitute generated character in the regenerated character stream 86a–86b appears in the character stream 50, it is supplied through the decrementing circuit of the data path 44 to the character register 47. This aspect of operation is shown on line 9, Slots III and IV. In the third slot time, the character appears with a 10 configuration rather than the 11 configuration, which is shown on line 8 of the origin character stream. In the fourth slot time, the character is 01 rather than the 10 character in the character stream. The character stream has, therefore, been decremented each time that the character has appeared in the character stream.

The decrementing operation continues until the start of translate tag of the characters stored in translator memory 35 is detected by the tag latch 39 through the connection 38. Tag latch 39 provides an indication through the connection 68 to Exclusive-OR circuit 67. Since this input signal is the only input supplied to this circuit at this time (the output level from inverter 80 is at a down level), the compare latch 65 is reset. Concurrently, the SOT tag output from latch 39 is supplied to AND 101 along with the decrement trigger output to reset the translate mode bit in register position 1 of character register 47. This operation is shown on line 20 of the timing diagram.

Resetting of the translate mode bit in character register 47 causes the output from decrement trigger to drop. Since the decrement trigger 53 provides a down level output signal, the decrement controls in the multiplexor are reset from the output of clocked AND 98, as shown on line 19 of the timing diagram. The character that is now in the regenerated character stream 86a–86b is applied as the character stream to the direct circuit of the data path, including the gate 49 and the OR circuit 48. This character is the translated character which has to be gated through the gating circuit 56 to the result register 57 to be provided as the result in the regenerated stream or at the outputs 58 and 59. The gating is accomplished through OR 103 and the AND gates 94, 95 and 96.

To perform this gating, the output from Exclusive-OR circuit 67 is concurrently supplied through the connection 106 to OR circuits 102 and 103. Enabling OR 102 has the effect of generating a signal at AND 97 to reset or inhibit any action by the first register position in result register 57. Application of the signal from Exclusive-OR 67 to OR 103 permits read out of the character then in the second and third register positions of character register 47 to the result register 57. These operations of gating from the character register 47 to the result register 57 are illustrated on lines 16 and 17 of the timing diagram. Thus, the translation has been performed with the substitute character generated in the translator. It is operated on and provided as the result.

Although detection of the start of Start of Translate (SOT) tag at the output of translator memory 35 is shown in Slot I on line 4 of the timing chart, the occurrence of the translate mode bit in the character stream 50 does not necessarily have to occur at the same time the SOT tag is detected at tag latch 39. For purposes of illustration, the concurrence of these conditions has been shown as happening at the same time; however, this is not a necessity in order to perform the backward direction translation.

While the invention has been particularly shown and described with reference to a preferred embodiment thereof, it will be understood by those skilled in the art that various changes in form and details may be made therein without departing from the spirit and scope of the invention.

What is claimed is:

1. A code translator for effecting a code translation in a first direction from a character entered into the translator in a first code to that of a corresponding character stored in the translator in a second code or in a second direction from a character in the translator in a second code to the corresponding character exiting from the translator in a first code, said translations occurring in response to a request for translation in a first or second direction, comprising a data path having an input for accepting a character and an output and means for regenerating the output to the input, said path further comprising means for altering a character by a fixed amount each time that it is regenerated through the means for altering of the data path, said means for altering being coupled to the input and output of the data path, means for storing a plurality of characters expressed in a second code with a predetermined reference manifestation, first control circuitry coupled for responding to a request for translation in the first direction and to the occurrence of the predetermined reference manifestation when a character in a first code is accepted in the data path to provide a first signal, the first control circuitry also being coupled for responding to the outputs of the data path and the means for storing to produce a second signal, when a request for translation has been made in the second direction and a character in a first code is accepted in the data path, second control circuitry coupled for responding to the first signal and the request for translation in the first direction to activate the means for altering a character in the data path each time the character is regenerated through the data path, the second control circuitry also being coupled for responding to the second signal and the request for translation in the second direction to produce a character for substitution in the data path and for activating the means for altering a character to alter the substitute character each time that it is regenerated in the data path, the regeneration of the character when translation is occurring in the first direction continuing until a predetermined test is satisfied and the regeneration of the character when translation is occurring in the second direction continuing until the predetermined reference manifestation stored in the storage device is detected by the first control circuitry, a first gate means coupled for responding to the occurrence of the predetermined test in a translation in the first direction to permit the next character stored in the means for storing to be gated as the result translated character for a translation in the first direction, and a second gate means coupled for responding to the detection by the first control circuitry of the predetermined reference manifestation to enable the second gate means to permit the next character appearing in the data path to be gated as the result translated character for a translation in the second direction.

2. A code translator for effecting a code translation in one of two opposite directions at the translator output between a character entered into the translator at its input and a corresponding character in the translator, said translations occurring in response to a request for translation in one of the two directions, comprising a data path coupled to the translator input and output and comprising character altering means, the data path further comprising regenerating means coupled between the output and input of the translator, so that a character is altered each time that it is regenerated through the altering means of the data path, means for storing at least one character expressed in the code of the translator with a predetermined reference tag, first control circuitry coupled for responding to a request for translation in one direction and to the occurrence of the predetermined reference tag when a character is accepted in the data path to provide a first signal, the first control circuitry also being coupled for responding to the translator outputs and the means for storing to produce a second signal when a request for translation has been made in the other direction and a character is accepted in the data path, second control circuitry coupled for responding to the first signal and the request for translation in the one direction to activate the character altering means each time the character is regenerated in the data path, the second control circuitry also being coupled for responding to the second signal and the request for translation in the other direction to generate a character for the data path and for activating the character altering means to alter this character each time that it is regenerated in the data path, the regeneration of the character when translation is occurring in one direction continuing until a predetermined test is satisfied and the regeneration of the character when translation is occurring in the other direction continuing until the predetermined reference tag stored in the means for storing is detected by the first control circuitry, a first gate means coupled for responding to the occurrence of the predetermined test in a translation in the one direction to permit the next character stored in the means for storing to be gated as the result translated character, and a second gate means coupled for responding to the detection by the first control circuitry of the predetermined reference tag to enable the second gate means to permit the next data path character to be gated as the result translated character.

3. A code translator for effecting a code translation in one of two opposite directions at the translator output between a character entered into the translator at its input and a corresponding character in the translator, said translations occurring in response to a request for translation in one of the two directions, comprising a data path coupled to the translator input and output and comprising character altering means, the data path further comprising regenerating means coupled between the output and input of the translator, so that a character is altered each time that it is regenerated through the altering means of the data path, means for storing at least one character expressed in the code of the translator with a predetermined reference tag, control circuitry coupled for responding to a request for translation in a first direction and the predetermined reference manifestation to produce a signal to activate the character altering means when a character is accepted in the data path, the control circuitry also being coupled for responding to a character in the character path and the means for storing when a request for translation in a second direction occurs to generate a character for the data path and a signal to activate the character altering means to alter this character each time it is regenerated in the data path, the regeneration of the character when translation is occurring in one direction continuing until a predetermined test is satisfied and the regeneration of the character when translation is occurring in the other direction continuing until the predetermined reference tag stored in the means for storing is detected by the first control circuitry, a first gate means coupled for responding to the occurrence of the predetermined test in a translation in the one direction to permit the next character stored in the means for storing to be gated as the result translated character, and a second gate means coupled for responding to the detection by the first control circuitry of the predetermined reference tag to enable the second gate means to permit the next data path character to be gated as the result translated character.

4. The code translator of claim 3, wherein the character altering means is a decremeter which acts to decrement a charcater by a fixed amount each time the character enters this circuitry of the data path.

5. The code translator of claim 3, wherein the character altering means is an incrementer which acts to increment a character by a fixed amount each time the character enters this circuitry of the data path.

6. A code translator for effecting a code translation in one of two opposite directions at the translator output between a character entered into the translator at its input, and a corresponding character in the translator, said translations occurring in response to a request for translation in one of the two directions, comprising a data path coupled to the translator input and output and comprising character altering means, the data path further comprising regenerating means coupled between the output and input of the translator, so that a character is altered each time that it is regenerated through the altering means of the data path, a serial storage device having regeneration circuitry and including in the device a plurality of time slots corresponding in duration to the duration of a character applied to the translator input, so that the storage device can retain a plurality of characters expressed in the same code and with a predetermined reference tag, first control circuitry coupled for responding to a request for translation in one direction and to the occurrence of the predetermined reference tag when a character is accepted in the data path to provide a first signal, the first control circuitry also being coupled for responding to the translator outputs and the storage device to produce a second signal when a request for translation has been made in the other direction and a character is accepted in the data path, second control circuitry coupled for responding to the first signal and the request for translation in the one direction to activate the character altering means each time the character is regenerated in the data path, the second control circuitry also being coupled for responding to the second signal and the request for translation in the other direction to generate a character for the data path and for activating the character altering means to alter this character each time that it is regenerated in the data path, the regeneration of the charcter when translation is occurring in one direction continuing until a predetermined test is satisfied and the regeneration of the character when translation is occurring in the other direction continuing until the predetermined reference tag stored in the storage device is detected by the first control circuitry, a first gate means coupled for responding to the occurrence of the predetermined test in a translation in the one direction to permit the next character stored in the storage device to be gated as the result translated character, and a second gate means coupled for responding to the detection by the first control circuitry of the predetermined reference tag to enable the second gate means to permit the next data path character to be gated as the result translated character.

7. A code translator for accomplishing the translation of the code of a character entered into the input of the translator to the code of a character stored in the translator when the translation is requested, comprising a data path coupled to the translator input and comprising means for altering a character so that a character is altered each time it is applied to this circuitry of the data path, the data path also comprising regenerating means coupled between the output and input to the translator, means for storing at least one character expressed in the code of the translator with a predetermined reference tag, control circuitry responsive to the request for translation and the predetermined tag when a character is entered into the data path to provide an activating signal for the means for altering so that the character is altered each time it is regenerated in the data path, test circuit means coupled to the output of the means for altering a character to provide a gate signal when a predetermined test is accomplished, and gate means coupled to the means for storing and to the test circuit means to permit the next character in the means for storing to be gated from the translator as the translated character when the gate signal is provided.

8. A code translator for accomplishing the translation of the code of a character in the translator to the code of a character provided at the translator input when the translation is requested, comprising a data path coupled to the translator input and comprising means for altering a character so that a character is altered each time it is applied to this circuitry of the data path, the data path also comprising regenerating means coupled between the output and input to the translator, means for storing at least one character expressed in the code of the translator with a predetermined reference tag, comparator circuitry connected for responding to the outputs from the data path and the means for storing to provide a comparison signal when a comparison is effected, control circuitry connected to respond to the comparison signal and the request for translation to generate a character in the data path and to provide an activating signal for the means for altering, so that the character generated in the data path is altered each time it is regenerated in the data path, the control circuitry also being connected for responding to the predetermined tag to terminate the activating signal and to provide a gate signal, and gate means coupled to the output of the data path and to the control circuitry to permit the next character exiting from the data path to be gated from the translator as the translated character when the gate signal is provided.

9. A system for translating in a forward direction from the codes of characters supplied in a plurality of data channels to the codes of the corresponding characters in the system or in a backward direction from the codes of characters in the system to the codes of corresponding characters generated in the data channels, the direction of translation depending on the request mode for translation, comprising multiplexing circuitry for accepting in sequence a character supplied in each of the plural channels, translator circuit means coupled to the multiplexing circuitry and comprising control means and translator memory means coupled to the control means for storing plural code character trains with each code having a character stored in sequence corresponding to the sequence of character codes supplied to the multiplexing circuitry, and means coupled to the multiplexing circuitry and memory means for providing the translated characters, said control means of the translator circuit means being responsive to the direction of the request for translation and to the contents of the translator memory means to effect the sequential translation of the characters supplied to the multiplexing means to the corresponding characters stored in the translator memory means when the direction of translation is in the forward direction and to effect the sequential code translation of characters generated in the translator circuit means to the codes of characters supplied to the multiplexing circuitry when the direction of translation is in the backward direction.

References Cited

UNITED STATES PATENTS 3,229,078   1/1966   Boland ___________ 340—172.5

PAUL J. HENON, *Primary Examiner.*

G. D. SHAW, *Assistant Examiner.*